United States Patent
Comito et al.

(10) Patent No.: US 6,195,658 B1
(45) Date of Patent: Feb. 27, 2001

(54) METHOD AND SYSTEM FOR AUDITING A TEST DATABASE AGAINST A REFERENCE DATABASE

(75) Inventors: Richard Comito, Nahant, MA (US); Paul Boorom, N. Smithfield, RI (US); Dennis Carlan, Melrose, MA (US); Philip DiRocco, Randolph, MA (US); Wilfred St. Martin, Hyde Park, MA (US); George Spence, Dracut, MA (US)

(73) Assignee: Bell Atlantic Network Services, Incorporated, Framingham, MA (US)

( * ) Notice: Subject to any disclaimer, the term of this patent is extended or adjusted under 35 U.S.C. 154(b) by 0 days.

(21) Appl. No.: 09/354,449

(22) Filed: Jul. 15, 1999

(51) Int. Cl.[7] ..................................................... G06F 17/30
(52) U.S. Cl. ................................. 707/6; 707/202; 707/2; 379/37; 379/40; 379/45; 379/49; 379/201; 379/388; 455/402; 455/404
(58) Field of Search ..................... 379/201, 45, 37, 379/49, 388, 40; 707/6, 2, 202; 455/402, 404

(56) References Cited

U.S. PATENT DOCUMENTS

| | | | |
|---|---|---|---|
| 5,305,370 | * | 4/1994 | Kearns et al. ................... 379/45 |
| 5,870,733 | * | 2/1999 | Bass et al. ......................... 707/2 |
| 5,915,240 | * | 6/1999 | Karpf ................................. 705/2 |
| 5,931,946 | * | 8/1999 | Masato et al. ................. 707/201 |
| 6,006,332 | * | 12/1999 | Rabne et al. .................... 713/201 |
| 6,035,295 | * | 3/2000 | Klein ................................. 707/6 |
| 6,047,045 | * | 4/2000 | Bauer et al. ..................... 379/15 |
| 6,067,354 | * | 5/2000 | Bauer et al. ................... 379/113 |
| 6,085,200 | * | 7/2000 | Hill et al. ...................... 707/202 |
| 6,101,240 | * | 8/2000 | Blair et al. ...................... 379/45 |
| 6,104,784 | * | 8/2000 | Robbins ........................... 379/45 |

\* cited by examiner

Primary Examiner—Hosaint T. Alam
Assistant Examiner—Jean M. Corrielus
(74) Attorney, Agent, or Firm—Ohlandt, Greeley, Ruggiero & Perle

(57) ABSTRACT

A method for auditing databases containing records of varied record formats verifies records from a test database against records from a reference database. Records from the test database are converted to test tokens, and records from the reference database are converted to reference tokens. The tokens summarize select fields of data from the records. Thereafter, pattern recognition techniques are used to analyze the tokens to determine Whether the data in the test tokens matches to data in the reference tokens. When an erroneous test token is discovered, an update token is generated to correct a corresponding record in the test database. This method is particularly well suited for auditing enhanced 911 emergency telephone service selective router databases.

20 Claims, 7 Drawing Sheets

CONVERSION ENGINE

| SRDB DATA PATTERNS |
|---|
| NXX XXXAAAA YYX |
| NXX XXX AAAA YYX |
| NXX XXX A AAA YYX |
| NXXXXXAAA YYX |
| NXXXXXAAAYYX |

380 ──

| ALIDB DATA PATTERNS |
|---|
| NXXXXXXXXX XXX |
| NXXXXXXXXX YYX |
| NXX XXXXXXX XXX |
| NXX XXXXXXX YYX |
| NXX XXX XXXX XXX |
| NXX XXX XXXX YYX |

WHERE:
  N = 2 TO 9
  X = 0 TO 9
  A = "N", 0 TO 9
  Y = "","-", 0 TO 9

FIG. 6

ANALYSIS ENGINE

METHOD AND SYSTEM FOR AUDITING A TEST DATABASE AGAINST A REFERENCE DATABASE

BACKGROUND OF THE INVENTION

1. Field of the Invention

The present invention relates to the auditing of databases and, more particularly, to the auditing of large databases with varied record formats such as those used in enhanced 911 emergency telephone services.

2. Description of the Prior Art

Many corporations and government agencies work with databases composed of millions of records. Errors can be introduced into these records through software defects, electromagnetic interference with the storage media, or through human oversight when entering or modifying data. In many applications, errors are discovered and corrected during the regular course of business, such as when a bank statement is reconciled monthly. However, where a record is not regularly accessed or updated, an error can lie undetected for years.

A database containing important information should be periodically audited to verify its integrity, particularly when the database has records that are not regularly accessed or updated. Although intuition favors the idea of periodic audits, economic or logistic obstacles often frustrate this practice. The task becomes even more daunting when an audit involves reconciling several different databases containing related information in different formats, or when the databases are located remotely from one another. Also, some databases are not readily available for audit because they are subject to some level of regular activity.

Enhanced 911 (E911) telephone service allows a person to call for emergency assistance by dialing 911 from a telephone. An E911 call is routed to an E911 switchboard. An operator at the E911 switchboard speaks with the caller and views information on a display.

An E911 call is typically routed to an E911 switchboard in a firehouse or police department that services the area from which the call originated. The routing of the E911 call is determined by an emergency service number (ESN) stored in an E911 selective router database (SRDB) associated with a tandem switch (hereinafter "tandem"). A tandem routes a telephone call from its point of initiation to a destination. A typical SRDB contains records relating to 200,000 to 1,000,000 telephone numbers. An error in an SRDB can misdirect an E911 call, and delay the response to the emergency. The consequence of such a delay could, most certainly be very serious or grave.

Throughout the northeast United States, there are dozens of SRDB's containing records for tens of millions of telephone numbers. Tandems are manufactured by several different vendors, and the record formats for data stored in the SRDB's are not standardized. An SRDB record is updated in the normal course of business, only when a telephone line is initially activated or when the customer changes address but keeps the same telephone number. Since most telephone lines, once activated, remain so for years, an error in an SRDB record is not likely to be discovered.

SUMMARY OF THE INVENTION

It is an object of the present invention to provide a method of expediently auditing large databases.

It is another object of the present invention to provide such a method of auditing databases containing records of varied formats.

It is still another object of the present invention to provide a method of auditing enhanced 911 emergency telephone service selective router databases.

These and other objects of the present invention will be achieved by a process for auditing a database that is particularly adapted to handle large databases with non-standardized record formats as in the case of enhanced 911 telephone service selective router databases.

BRIEF DESCRIPTION OF THE DRAWINGS

FIG. 6 is a table of examples of pre-established data patterns for selective router database records and automatic location identifier database records.

DESCRIPTION OF THE INVENTION

Before proceeding with a description of the present invention, it is well to define certain terms and acronyms to be used in this application.

A reference database is a database that has a reference record. The reference database is assumed to be complete and accurate. A test database is a database that has a test record. The test database is subject to audit.

A conversion engine examines data patterns in the reference records and the test records and searches for a recognizable record format. A recognizable record format can be found from a currently recognized data pattern, a pre-established data pattern, or a new data pattern that is discovered while examining a record. A reference record is converted to a reference token, and a test record is converted to a test token. The reference token and the test token summarize select fields of data in a common token format that is easily parsed and analyzed.

An analysis engine compares a reference token with a test token to determine whether the data represented by the test token is correct. The analysis engine is capable of handling a test token that has a wildcard field that represents a range of data values. If the analysis engine discovers an error, it generates an update token. An update token contains data to correct an erroneous test record. An update engine reformats the update token and thereafter updates the erroneous test record.

An automatic location identifier (ALI) is a system that sends information regarding the person and/or location to which a telephone number is assigned, to an enhanced 911 switchboard.

An automatic location identifier database (ALIDB) is a database, indexed by telephone number, containing information regarding the person and/or location to which the telephone number is assigned.

An emergency service number (ESN) is a 3-digit number assigned to uniquely identify each enhanced 911 switchboard.

A selective router database (SRDB) is a database, indexed by telephone number, containing the emergency service number assigned to the telephone number.

Figure 1:
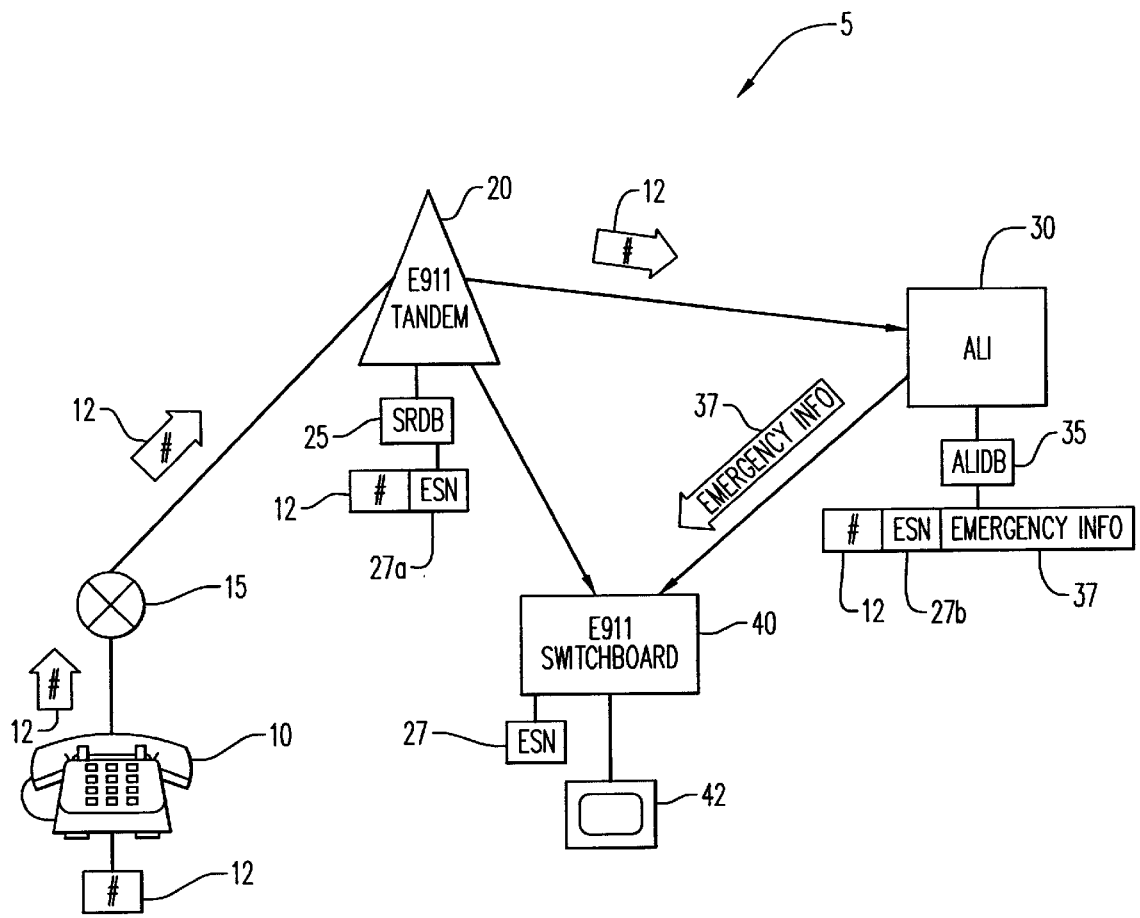
FIG. 1 is a basic block diagram of a prior art enhanced 911 emergency telephone system.

Referring to the drawings and, in particular, FIG. 1, there is illustrated a basic block diagram of an E911 system 5. E911 system 5 has a telephone 10 that connects to an E911 switchboard 40 through a local switching network 15 and an E911 tandem 20. An automatic location identifier (ALI) system 30 is also connected to E911 tandem 20 and E911 switchboard 40.

A 911 call placed from telephone 10 (accompanied by a telephone number 12 of the telephone) is routed to E911 switchboard 40, which is identified by an ESN 27. The 911 call is routed from telephone 10 through local switching network 15 to E911 tandem 20. E911 tandem 20 uses telephone number 12 to query SRDB 25 and obtain an ESN 27a that identifies E911 switchboard 40 as the destination for the 911 call. The E911 tandem 20 then routes the 911 call to E911 switchboard 40.

E911 tandem 20 also relays telephone number 12 to ALI system 30, which uses telephone number 12 to query an ALI database (ALIDB) 35. The ALIDB record, indexed by telephone number 12, contains an ESN 27b, which identifies E911 switchboard 40, and emergency information 37 related to the ahousehold and person(s) associated with telephone number 12. ALI system 30 transmits emergency information 37 to E911 switchboard 40. An operator at E911 switchboard 40 speaks with the person who placed the 911 call from telephone 10 and views emergency information 37 presented on a display 42.

The successful operation of E911 system 5 requires that SRDB 25 and ALIDB 35 contain accurate data. For example, if 30 the record indexed by telephone number 12 in SRDB 25 contains an ESN 27a that does not identify E911 switchboard 40, E911 tandem 20 will route the 911 call from telephone 10 to an incorrect E911 switchboard.

The SRDB 25 and ALIDB 35 are updated to reflect changes in telephone service, such as when telephone lines are added or deleted. For example, if a telephone subscriber moves across town and retains his or her telephone number 12, ESN 27a and 27b must be updated to designate an E911 switchboard in a different fire department.

A change in telephone service is initiated when a service order, specifying the change, is prepared. The service order includes instructions to a service worker who performs the required work. Thereafter, information in the service order is sent to ALI system 30 where ALIDB 35 is updated to reflect the change in service. Because there is a short, direct path between a service order and the ALIDB 35, the data in the ALIDB is assumed to be correct. ALIDB 35 is the source of data for subsequent updating of SRDB 25. The full E911 system 5 includes only one ALIDB 35, but there are dozens of E911 tandems 20, and each E911 tandem 20 has a corresponding SRDB 25.

Figure 2:
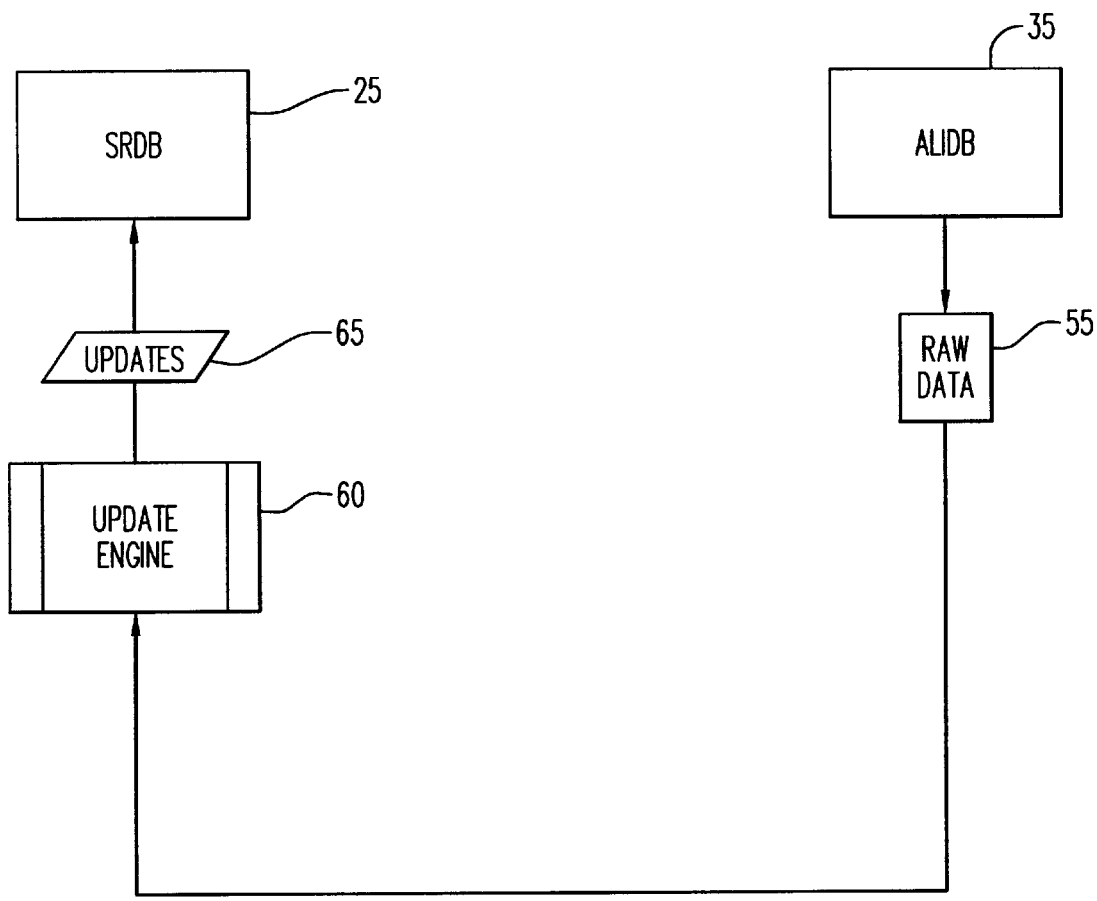
FIG. 2 is a data flow diagram of a prior art process for daily updating of an enhanced 911 selective router database.

FIG. 2 is a data flow diagram of the process for daily updating of an individual SRDB 25. Update records from ALIDB 35 are transmitted as raw data 55 to an update engine 60. The raw data 55 transmitted by ALIDB 35 is not necessarily in a format that can be used by SRDB 25. Update engine 60 reformats raw data 55 to produce updates 65, and transmits updates 65 to SRDB 25.

Usually several hundred to several thousand records are updated in a day for any particular SRDB such as SRDB 25. Updating a single record takes 1½–2 seconds, therefore, a daily update of SRDB 25 is typically completed in less than an hour.

Figure 3:
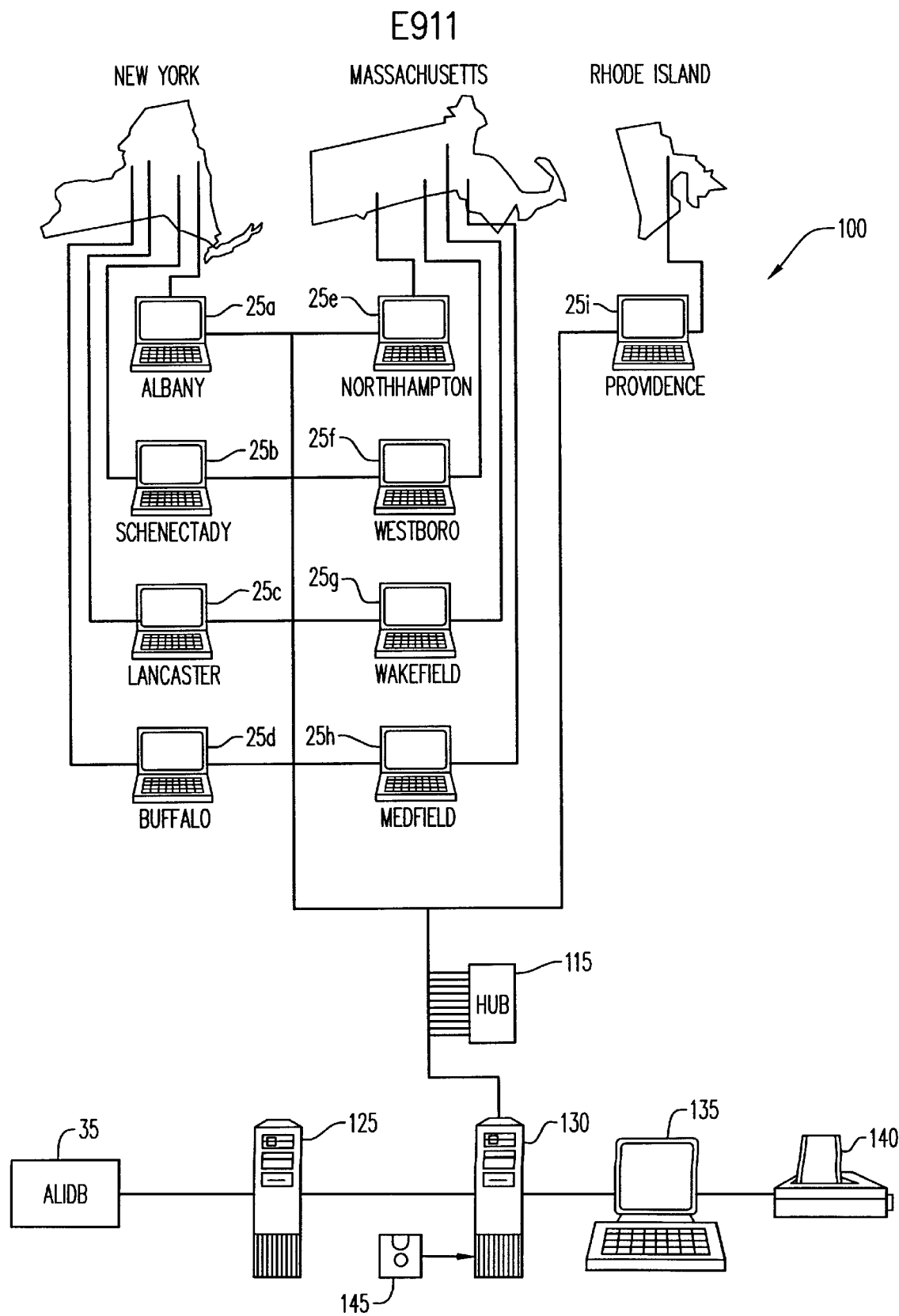
FIG. 3 is a block diagram of a computer network enabling access to an automatic location identifier database and to enhanced 911 selective router databases located in part of the northeast United States.

FIG. 3 is a block diagram of a computer network 100, that enables access to ALIDB 35 and to SRDB's that are located in part of the northeast United States. Such SRDB's, such as, for example, SRDB's 25a–25i, are coupled to a hub 115, which is linked to a processor 130. One ALIDB 35 is coupled to a processor 125, which is also linked to processor 130. A console 135 is connected to control processor 130 and a printer 140.

The connectivity between the components of computer network 100 enables processor 130 to execute the process for daily updates to SRDB's 25a–25i, as shown in FIG. 2 and described above. That is, ALIDB 35 transmits raw data 55 in File Transfer Protocol (FTP) format to processor 125, which forwards the raw data 55 to processor 130. Processor 130 includes a computer memory from which it runs update engine 60 (FIG. 2) to produce updates 65, and transmits updates 65 through hub 115 to a target SRDB 25a–25i. Hub 115 permits selective routing of data between processor 130 and any target SRDB 25a–25i.

One problem that must be appreciated when dealing with SRDB's 25a–25i as a group is that SRDB's 25a–25i and their associated E911 tandems are manufactured by different vendors. The record formats of the data contained within SRDB's 25a–25i are not standardized, and consequently, the record formats vary from vendor to vendor. Also, software changes made by a vendor sometimes result in variations of record format even within that vendor's line of products. Each SRDB 25a–25i contains records representing 200,000 to 1,000,000 telephone numbers. Additionally, SRDB's 25a–25i may be mirrored one or more times. Mirroring is a process for creating a backup copy of a file or database to allow for recovery from a disaster in a case where the original file or database is destroyed. Collectively, SRDB's 25a–25i, with their mirrored backups, contain several million records of several different record formats. The auditing of SRDB's 25a–25i presents a technical challenge because of their size and inconsistent record formats, and a logistical challenge because at least some of their records are likely updated each day.

Figure 4:
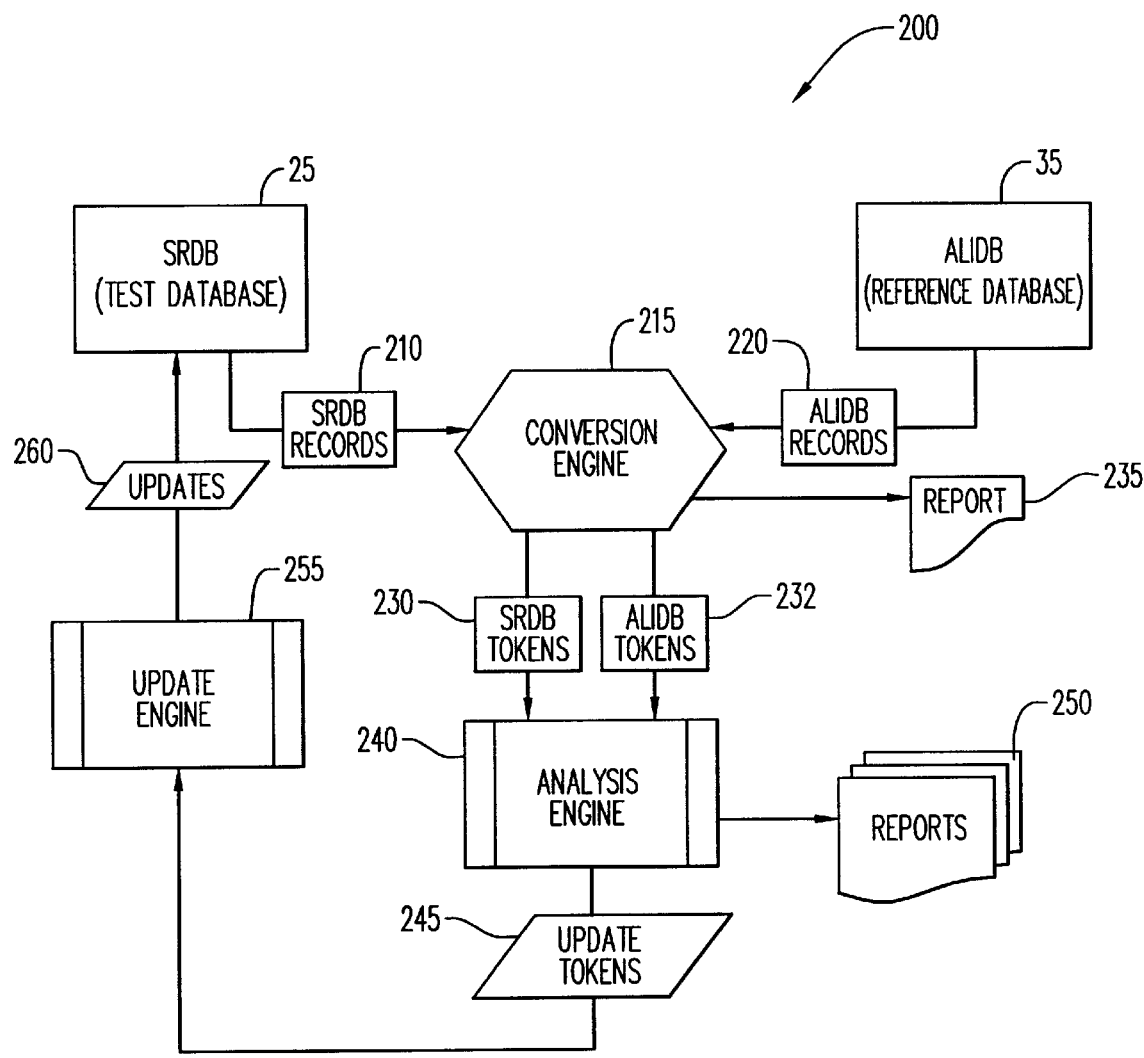
FIG. 4 is a data flow diagram of a database auditing process according to the present invention.

FIG. 4 is a data flow diagram of a database auditing process according to the present invention and generally represented by reference number 200. Database auditing process 200 is described in the present invention in the context of an E911 system, but it can be applied to auditing of other types of databases. The database auditing process 200 is executed in processor 130 of computer network 100 shown in FIG. 3.

In this example, ALIDB 35 is a reference database and SRDB 25 is a test database. SRDB 25 contains records that may be of several different formats, and the records in ALIDB 35 may be in yet another format. SRDB records 210 and ALIDB records 220 are each sorted by area code and telephone number, in ascending order.

Conversion engine 215 examines records and searches for recognizable record formats. It produces tokens that summarize select fields of data. The tokens have a common format and they are easily parsed and analyzed. For example, the tokens may be formatted to include a 3-character area code, 7-character phone number and 3-character ESN, all concatenated as a 13-character string. In the present example, conversion engine 215 converts SRDB records 210 into SRDB tokens 230, and converts ALIDB records 220 into ALIDB tokens 232. If conversion engine 215 cannot successfully convert a record, it produces an error report 235. The process performed by conversion engine 215 is described in greater detail below.

Analysis engine 240 compares tokens derived from a test database with tokens derived from a reference database and determines whether the tokens match. In the present example, analysis engine 240 operates on SRDB tokens 230 and ALIDB tokens 232.

SRDB records 210, and their corresponding SRDB tokens 230, may contain one or more wildcard fields. A wildcard field affirmatively matches with any value to which it is compared. A wildcard field in an SRDB token 230 will match a range of telephone numbers in an ALIDB token 232. If, on their face, an SRDB token 230 and an ALIDB token 232 do not literally match, then analysis engine 240 considers whether the SRDB token includes a wildcard field.

ALIDB tokens 232 (reference tokens) are assumed to be complete and accurate. There is one ALIDB token 232 for every telephone number covered by the E911 system. Each ALIDB token 232 is formatted as a 13-character string consisting of a 3-digit area code, 7-digit telephone number and 3-digit ESN.

SRDB tokens 230 (test tokens) are not assumed to be complete or accurate. This is partly because SRDB 25 is susceptible to errors introduced during manual modifications or software upgrades to SRDB records 210. Additionally, although not necessarily indicative of an error, there is usually not an SRDB token 232 for each telephone covered by the E911 system. In practice, a particular firehouse with an E911 switchboard is designated to handle emergencies for a specific geographic area of a municipality. The telephones within that geographic area usually have the same 3-digit area code and often have the same first three digits (i.e., office code) in their 7-digit telephone numbers. For example, all telephone numbers with an area code of 914 and an office code of 222 may be assigned an ESN of 123, regardless of the last four digits of the telephone number. An ESN assigned to a range of telephone numbers is referred to as a predominant ESN. Therefore, a block of telephone numbers ranging from 9142220000 to 9142229999, that are each assigned an ESN of 123, can be generally represented by a single SRDB token of 914222NNNN123, where "NNNN" is a wildcard field.

It may occur that one or more telephone numbers in the block ranging from 9142220000 to 9142229999 are assigned an ESN of other than 123. This can occur, for example, where a telephone is located near the edge of a geographic area, and is closer to a firehouse in a different geographic area. For example, if telephone numbers 9142220001 and 9142221234 are exceptions to the general case, and are assigned an ESN of 789, then SRDB tokens 230 would include 9142220001789, 914222NNNN123, 9142221234789 and 914222NNNN123. The first occurrence of 914222NNNN123 represents telephone numbers 9142220002 through 9142221233, inclusive. The second occurrence of 914222NNNN123 represents telephone numbers 9142221235 through 9142229999, inclusive.

If analysis engine 240 ultimately determines that an ALIDB token 232 cannot be matched to any SRDB token 230, or vice versa, then analysis engine 240 produces an update token 245 and an error report 250. Update token 245 contains data to correct SRDB token 230. The process performed by analysis engine 240 is described in greater detail below.

Update engine 255 receives and extracts data from an update token 245 to produce an update 260 that it transmits to SRDB 25. Erroneous records in SRDB 25 are thereby corrected.

Figure 5:
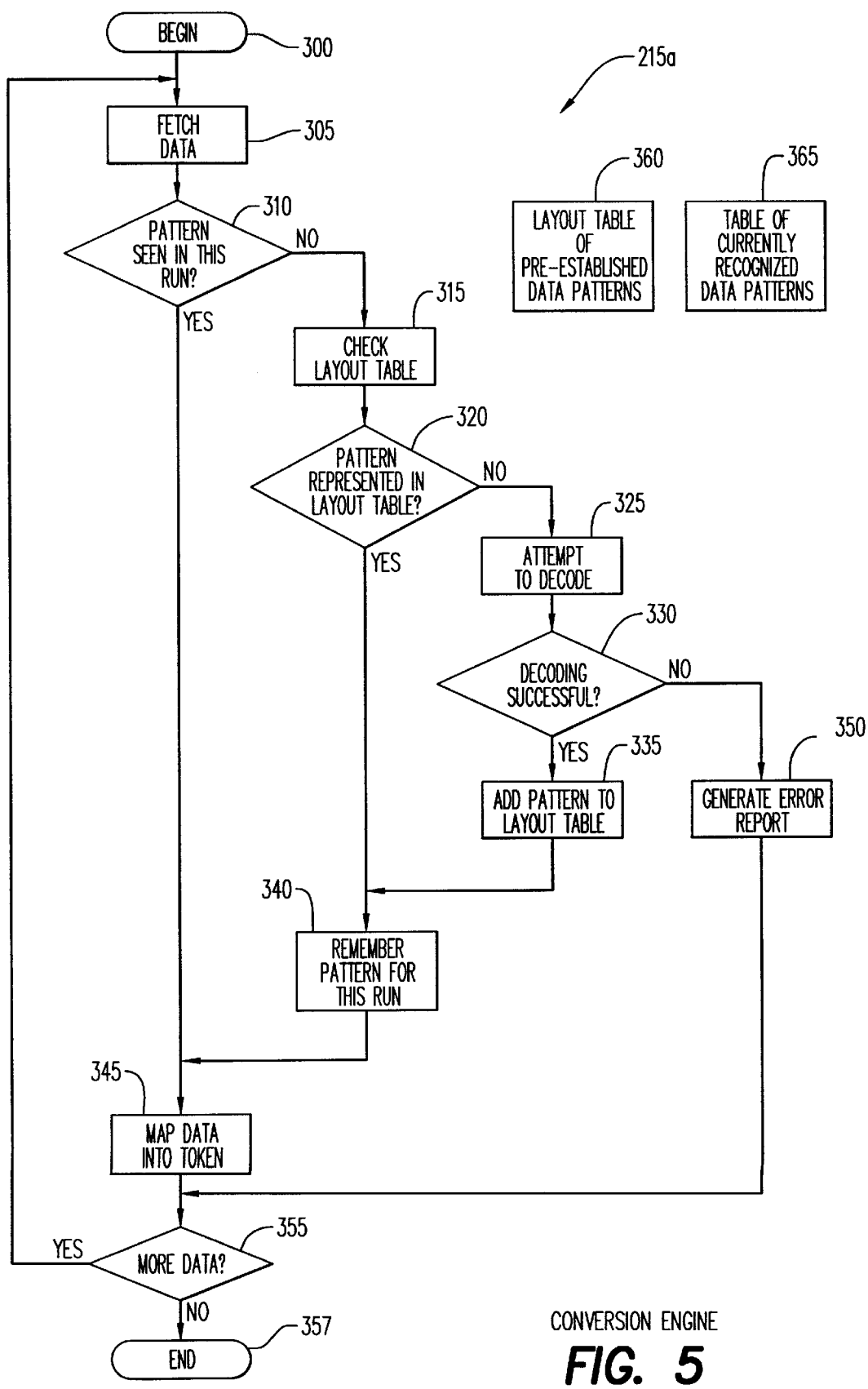
FIG. 5 is a flowchart of the operation of the conversion engine of the present invention as applied to an enhanced 911 emergency telephone system.

FIG. 5 is a flowchart illustrating the conversion engine process 215a performed by conversion engine 215 shown in FIG. 4. The following example describes the operation of the present invention in the context of an E911 system.

The conversion engine process 215a operates on two separate input files, i.e., SRDB records 210 and ALIDB records 220. The conversion engine process 215a may be run serially, that is, once for each input file, or it may be run as two instances in parallel. For this example, assume conversion engine process 215a is operating on SRDB records 210.

The conversion engine process 215a attempts to identify recognizable record formats by examining data patterns in the records under examination. Conversion engine process 215a employs two data structures during its execution. The first data structure is a layout table of pre-established data patterns 360. Pre-established data patterns are those that are already known. They may be specified by software developers, or they may have been discovered during prior executions of conversion engine process 215a. Also, if a new data pattern is discovered during a current execution of conversion engine process 215a, the new data pattern will be stored into the layout table of pre-established data patterns 360. The second data structure is a table of currently recognized data patterns 365, which contains data patterns that have been previously observed and memorized during a current execution of conversion engine process 215a. The table of currently recognized data patterns 365 is maintained for a given execution of conversion engine process 215a because experience shows that if one record from a file conforms to a particular data pattern, then chances are that other records from that file will also conform to that particular data pattern.

FIG. 6 shows some examples of pre-established data patterns for SRDB records and ALIDB records. Each data pattern represents a 3-character area code, a 7-digit telephone number and a 3-digit ESN. For example, an SRDB record with a data string "1914 2225555 999" conforms to data pattern "NXX XXXAAAA YYX", shown as reference 380. Note that the data patterns may include spaces and wildcards.

In practice, and referring again to FIG. 5, the table of currently recognized data patterns 365 is maintained in a random access memory (RAM), while the table of pre-established data patterns 360 is maintained on a hard drive. By maintaining the table of currently recognized data patterns 365 in RAM rather than on a hard drive, the number of accesses to the hard drive is greatly reduced. This feature provides a significant improvement in performance when conversion engine process 215a is operating on a database containing millions of records.

The conversion engine process 215a begins with step 300 and advances to step 305 where it fetches, i.e., reads, an SRDB record.

In step 310, the SRDB record is examined to determine whether its data pattern conforms to a pattern in the table of currently recognized data patterns 365. When examining the first record, no pattern has yet been inputted into the table of currently recognized data patterns 365. If the SRDB record conforms to a pattern in the table of currently recognized data patterns 365, then the process advances to step 345. If the SRDB record does not conform to a pattern in the table of currently recognized data patterns 365, then the process advances to step 315.

In steps 315 and 320, the SRDB record is checked against patterns in the layout table of pre-established data patterns 360. If the SRDB record conforms to a pattern in the layout table of pre-established data patterns 360, then the process advances to step 340. If the SRDB record does not conform to a pattern in the layout table of pre-established data patterns 360, then the process advances to step 325.

In steps 325 and 330, conversion engine process 215a attempts to decode an SRDB record having a format that has not yet been recognized. In a general case, steps 325 and 330 parse a data stream in a record and search for a valid data pattern. For example, an SRDB record is assumed to include fields representing a 3-character area code, a 7-character telephone number and a 3-character ESN. The first character of the area code must be a digit in the range of 2–9, and the fields may be adjacent to one another, or they may be separated by spaces. If conversion engine process 215a locates a character string of "9142221234 321", it may conclude that the string represents a valid new data pattern, i.e., "10digits-2 spaces-3 digits." If a new pattern is recognized, the process advances to step 335. If a new pattern is not recognized, the process advances to step 350.

In step 335, the new data pattern is stored into the layout table of pre-established data patterns 360. The process then advances to step 340.

In step 340, the data pattern, which may be either a pre-established data pattern from step 320 or a new data pattern from step 335, is stored into the table of currently recognized data patterns 365. The process then advances to step 345.

In step 345, select data from the SRDB record is mapped and copied into an SRDB token based on the data pattern to which the SRDB record was determined to conform. For example, if the SRDB record contains a data pattern of "10 digits-space-3 digits", the mapping function would extract the 10 digits, eliminate the space, extract the 3 digits, and concatenate the 10 digits and 3 digits to produce a 13-digit string. The process then advances to step 355.

In step 350, an error report is generated to indicate that the SRDB record did not contain a recognizable record format. The process then advances to step 355.

In step 355, conversion engine process 215a determines whether there are more SRDB records to examine. If there are more SRDB records, the process branches back to step 305. If there are no more records, the process advances to step 357 and ends.

Figure 7:
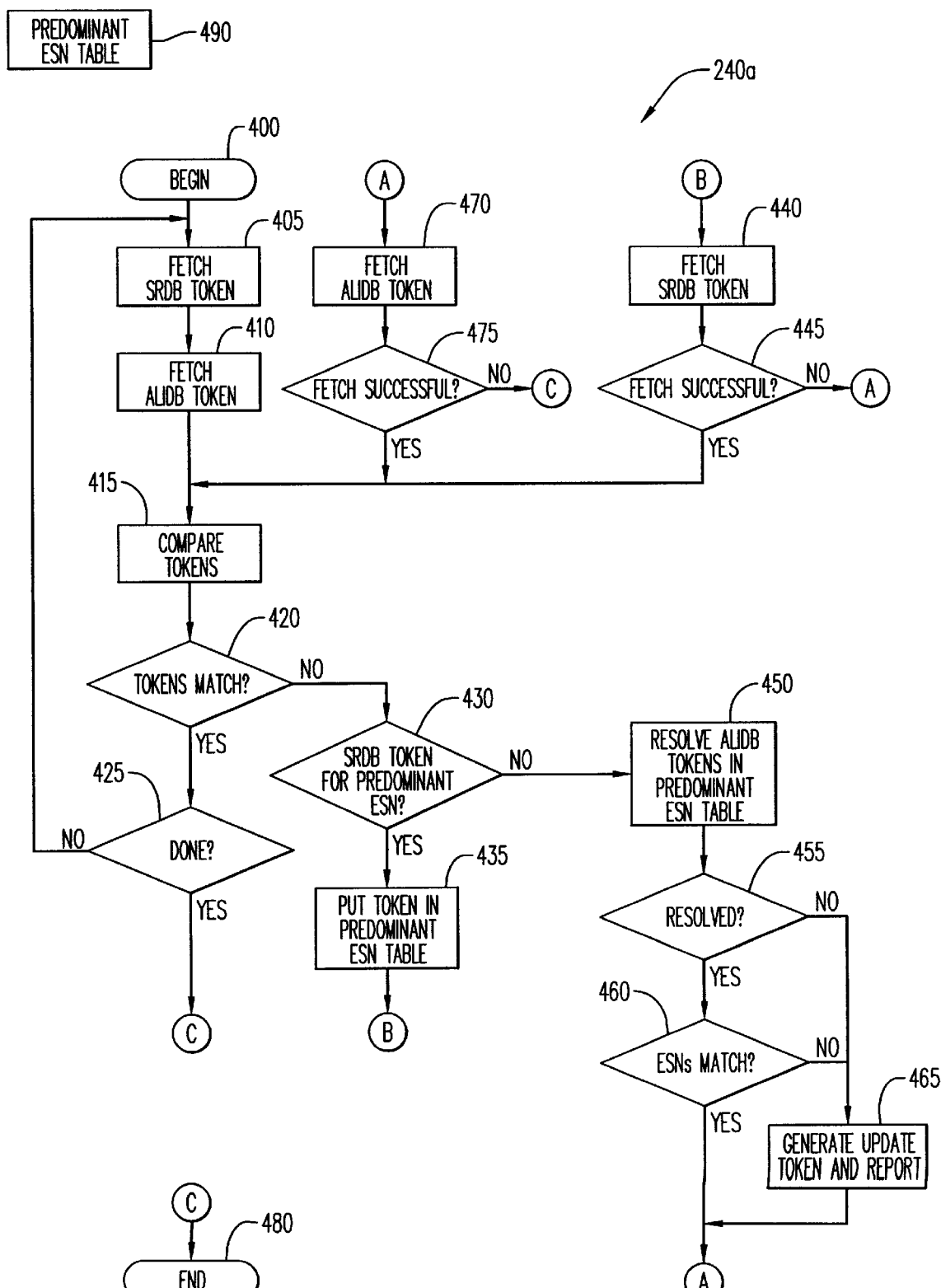
FIG. 7 is a flowchart of the analysis engine of the present invention as applied to an enhanced 911 emergency telephone system.

FIG. 7 is a flowchart of the analysis engine process 240a performed by analysis engine 240 shown in FIG. 4. This flowchart continues to describe the operation of the present invention in the context of an E911 system. The analysis engine process 240a compares SRDB tokens 230 shown in FIG. 4, to ALIDB tokens 232 also shown in FIG. 4, and determines whether data in the tokens match in accordance with a comparison parameter.

The analysis engine process 240a maintains a table of currently recognized predominant ESN's in a predominant ESN table 490. If an SRDB token is found to represent a predominant ESN, the token will be recorded in this table as a currently recognized predominant token. In a general case, this is a table of currently recognized wildcard tokens. A wildcard token contains a wildcard field that can be matched to data in more than one reference token.

The analysis engine process 240a begins with step 400 from which it advances to step 405 to read an SRDB token, and to step 410 to read an ALIDB token. The process then advances to step 415.

In steps 415 and 420, the SRDB token is compared to the ALIDB token and a determination is made as to whether the data in the tokens is identical. For example, an SRDB token of 9142220001789 compared to an ALIDB token of 9142220001789 yields a match. An SRDB token of 914222NNNN123 compared to an ALIDB token of 9142220002123 does not, at this step, yield a match. If the tokens are not identical, the process advances to step 430. If the tokens are identical, the process advances to step 425.

In step 425, analysis engine process 240a determines whether there are more tokens to process. If there are more tokens, analysis engine process 240a branches back to step 405 to read a next SRDB token, and then progresses to step 410 to read a next ALIDB token. If there are no more tokens, analysis engine process 240a advances to step 480.

In step 430, the SRDB token is examined to determine whether it is a predominant token. A predominant token contains a wildcard field, thus designating a block of telephone numbers to a predominant ESN. For example, an SRDB token of 914222NNNN123 contains a wildcard field "NNNN" and designates a predominant ESN "123", while an SRDB token of 9142221234789 does not contain a wildcard field or designate a predominant ESN. If he SRDB record designates a predominant ESN (i.e., contains a wildcard field), then the process advances to step 435. If the SRDB record does not designate a predominant ESN (i.e., does not contain a wiidcard field), then the process advances to step 450.

In step 435, the SRDB token is placed into the predominant ESN table 490. In general terms, the test token is placed in a table of tokens having wildcard fields. A test tokens with a wildcard field can be matched to more than one reference token. The process then advances to step 440.

In steps 440 and 445, analysis engine process 240a attempts to fetch (i.e., read) a next SRDB token. If the fetch is successful, then the process branches back to step 415. If the fetch is not successful, then the process advances to step 470.

In steps 450 and 455, the ALIDB token is compared to a token with a wildcard field in the predominant ESN table 490. An ALIDB token of 9142220002123 matches a predominant ESN token of 914222NNNN123 because 9142220002 falls within the range of wildcard 914222NNNN. At this point, an ALIDB token of 9142221234789 also matches a predominant ESN token of 914222NNNN123, even though the last three digits are not the same, because 9142221234 falls within the range of wildcard 914222NNNN. If the tokens match, the process advances to step 460. If the tokens do not match, the process advances to step 465.

In step 460, the ALIDB token ESN is compared to the SRDB token ESN. An ALIDB token ESN "123" matches an SRDB ESN "123". An ALIDB token ESN "7139" does not match an SRDB token ESN "123". Therefore, an ALIDB token of 9142221234789 matches a predominant ESN token of 914222NNNN789, and an ALIDB token of 9142221234789 does not match a predominant ESN token of 914222NNNN123. If the ESN's match, then the process advances to step 470. If the ESN's do not match, the process advances to step 465.

In step 465, analysis engine process 240a generates an update token and a report for each ALIDB token that could not be matched to an SRDB token. The update tokens contain data to correct missing or erroneous records in SRDB 25 shown in FIG. 4. In the general case, an update token and report are generated for each reference token that could not be matched to a test token. The process then advances to step 470.

In steps 470 and 475, analysis engine 240 attempts to fetch (read) a next ALIDB token. If the fetch is successful, the process branches back to step 415. If the fetch is not successful, the process advances to step 480.

At step 480, the process ends.

The database auditing process of the present invention and its use of reference tokens and test tokens to summarize data records is particularly suited for large, non-standardized databases such as those in an E911 system. In the context of the E911 emergency telephone system, an automatic location identifier database serves as a reference for auditing a selective router database. The present invention handles non-standard record formats and records with wildcards that represent ranges of telephone numbers assigned to predominant emergency service numbers.

It should be understood that various alternatives and modifications can be devised by those skilled in the art, and the present invention can be applied to other types of databases. For example, it could readily be applied to databases for accounting systems or inventory control. Further, while the procedures required to execute the present invention are indicated as already loaded into the memory of a processor, they may be configured on a storage media, such as data memory 145 in FIG. 3, for subsequent loading into the processor. Accordingly, the present invention is intended to embrace all such alternatives, modifications and variances that fall within the scope of the appended claims.

What is claimed is:

1. A method for auditing a test database against a reference database, said reference database having a reference record designed to correspond to a test record in said test database, said reference record represented by a reference token containing select data from said reference record, and said test record being in any one of a plurality of formats, said method comprising:

determining whether said test record format conforms to a recognizable record format by:
  determining whether said test record has a data pattern that conforms to a currently recognized data pattern;
  determining whether said test record has a data pattern that conforms to a pre-established data pattern, when said test record does not have said data pattern that conforms to said currently recognized data pattern; and
  saving said pre-established data pattern as said currently recognized data pattern, when said test record has said data pattern that conforms to said pre-established data pattern;
copying select data from said test record into a test token when said test record format conforms to said recognizable record format; and
determining whether data in said reference token matches data in said test token in accord with a comparison parameter,
wherein said reference token and said test token have a common token format.

2. The method recited in claim 1, further comprising:
generating an update token that contains data to correct said test record when said data in said reference token does not match said data in said test token.

3. The method recited in claim 1, wherein determining whether said test record format conforms to a recognizable record format further comprises:
determining whether said test record has a data pattern that conforms to a new data pattern; and
saving said new data pattern as said currently recognized data pattern, when said test record has said data pattern that conforms to said new data pattern.

4. The method recited in claim 3, further comprising saving said new data pattern as said pre-established data pattern, when said test record has said data pattern that conforms to said new data pattern.

5. The method recited in claim 3, wherein determining whether said test record has a data pattern that conforms to a new data pattern comprises parsing a data stream in said test record and searching for a valid data pattern.

6. The method recited in claim 1, wherein determining whether data in said reference token matches data in said test token in accord with a comparison parameter comprises:
determining whether data in said test token is identical to data in said reference token;
determining whether said test token is a wildcard token, when data in said test token is not identical to data in said reference token;
saving said test token as a currently recognized wildcard token, when said test token is said wildcard token; and
determining whether data in said reference token matches data in said currently recognized wildcard token, when said test token is not said wildcard token,
wherein said wildcard token contains a field that affirmatively matches any value to which said field is compared.

7. A memory media that stores a program for controlling a processor for auditing a test database against a reference database, said reference database having a reference record designed to correspond to a test record in said test database, said reference record represented by a reference token containing select data from said reference record, and said test record being in any one of a plurality of formats, said memory media comprising:

means for controlling said processor to determine whether said test record format conforms to a recognizable record format by:
  determining whether said test record has a data pattern that conforms to a currently recognized data pattern;
  determining whether said test record has a data pattern that conforms to a pre-established data pattern, when said test record does not have said data pattern that conforms to said currently recognized data pattern; and
  saving said pre-established data pattern as said currently recognized data pattern, when said test record has said data pattern that conforms to said pre-established data pattern;
means for controlling said processor to copy select data from said test record into a test token when said test record format conforms to said recognizable record format; and
means for determining whether data in said reference token matches data in said test token in accord with a comparison parameter,
wherein said reference token and said test token have a common token format.

8. The memory media recited in claim 7, further comprising:
means for generating an update token that contains data to correct said test record when said data in said reference token does not match said data in said test token.

9. The memory media recited in claim 7, wherein said means for controlling said processor to determine whether said test record format conforms to a recognizable record format further comprises:
means for determining whether said test record has a data pattern that conforms to a new data pattern; and means for saving said new data pattern as said currently recognized data pattern, when said test record has said data pattern that conforms to said new data pattern.

10. The memory media recited in claim 9, further comprising means for saving said new data pattern as said pre-established data pattern, when said test record has said data pattern that conforms to said new data pattern.

11. The memory media recited in claim 9, wherein said means for determining whether said test record has a data pattern that conforms to a new data pattern comprises means for parsing a data stream in said test record and searching for a valid data pattern, wherein determining whether said test record has a data pattern that conforms to a new data pattern comprises parsing a data stream in said test record and searching for a valid data pattern.

12. The memory media recited in claim 7, wherein said means for determining whether data in said reference token matches data in said test token in accord with a comparison parameter comprises:

means for determining whether data in said test token is identical to data in said reference token;

means for determining whether said test token is a wildcard token, when data in said test token is not identical to data in said reference token;

means for saving said test token as a currently recognized wildcard token, when said test token is said wildcard token; and means for determining whether data in said reference token matches data in said currently recognized wildcard token, when said test token is not said wildcard token, wherein said wildcard token contains a field that affirmatively matches any value to which said field is compared.

13. A method for auditing a 911 telephone service router database against a reference database, said reference database having a reference record designed to correspond to a router record in said router database, said reference record represented by a reference token containing select data from said reference record, and said router record being in any one of a plurality of formats, said method comprising:

determining whether said router record format conforms to a recognizable record format;

copying select data from said router record into a router token, when said router record format conforms to said recognizable record format; and determining whether data in said reference token imatches data in said router token, when said router record format conforms to said recognizable record format, wherein said reference token and said router token have a common token format.

14. The method recited in claim 13, further comprising:

generating an update token that contains data to correct said router record when said data in said reference token does not match said data in said router token.

15. The method recited in claim 13, wherein determining whether said router record format conforms to a recognizable record format comprises:

determining whether said router record has a data pattern that conforms to a currently recognized data pattern;

determining whether said router record has a data pattern that conforms to a pre-established data pattern, when said router record does not have said data pattern that conforms to said currently recognized data pattern; and saving said pre-established data pattern as said currently recognized data pattern, when said router record has said data pattern that conforms to said pre-established data pattern.

16. The method recited in claim 13, wherein determining whether said router record format conforms to a recognizable record format comprises:

determining whether said router record has a data pattern that conforms to a new data pattern; and saving said new data pattern as a currently recognized data pattern, when said router record has said data pattern that conforms to said new data pattern.

17. The method recited in claim 16, wherein determining whether said router record has a data pattern that conforms to a new data pattern comprises parsing a data string in said router record to locate a 3-character area code, a 7-character telephone number and a 3-character emergency service number.

18. The method recited in claim 16, further comprising saving said new data pattern as a pre-established data pattern, when said router record has said data pattern that conforms to said new data pattern.

19. The method recited in claim 13, wherein determining whether data in said reference token matches data in said router token in accord with a comparison parameter comprises:

determining whether data in said router token is identical to data in said reference token;

determining whether said router token is a predominant token, when data in said router token is not identical to data in said reference token;

saving said router token as a currently recognized predominant token, when said rouzer token is said predominant token; and determining whether data in said reference token matches data in said currently recognized predominant token, when said router token is not said predominant token, wherein said predominant token contains a field that affirmatively matches any value to which said field is compared.

20. The method recited in claim 13, wherein said common token format comprises a field representing a 3-character area code, a field representing a 7-character telephone number and a field representing a 3-character emergency service number.

* * * * *